Patented June 20, 1950

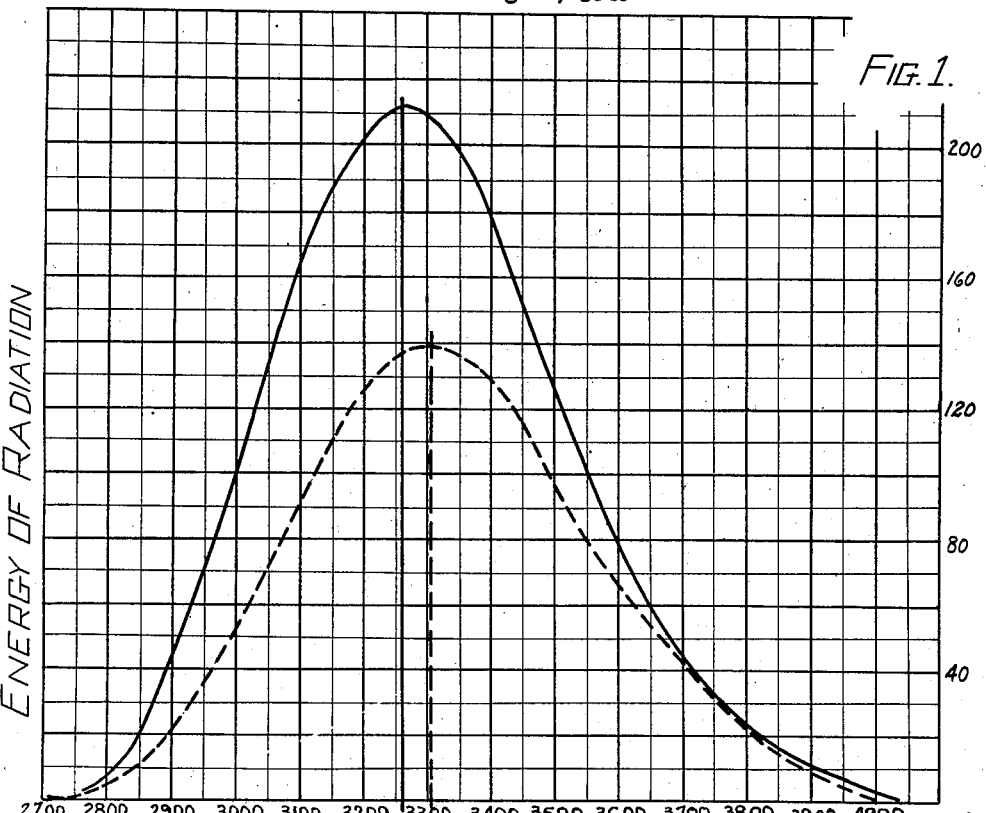
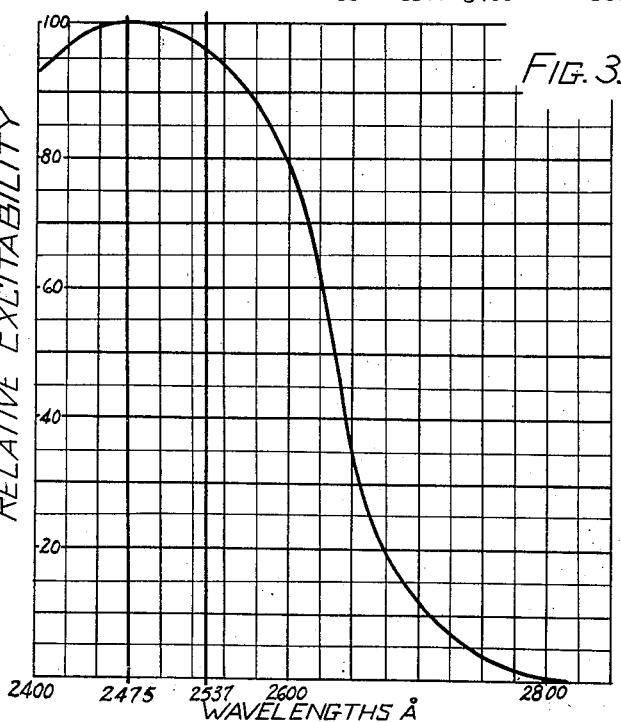
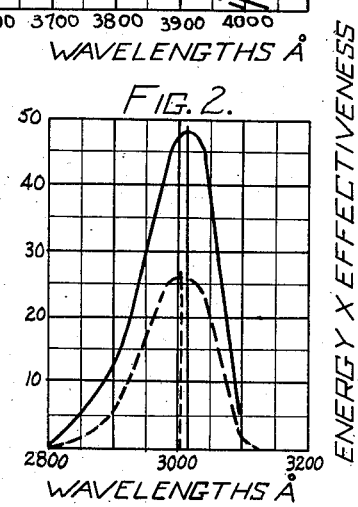

2,512,270

UNITED STATES PATENT OFFICE 2,512,270

METHOD OF MAKING AN IMPROVED ERYTHEMAL PHOSPHOR

Herman C. Froelich, Cleveland Heights, Ohio, assignor to General Electric Company, a corporation of New York Application August 2, 1945, Serial No. 608,487

8 Claims. (Cl. 252—301.4)

This invention relates to an erythemal generator or "sun lamp" of fluorescent type, comprising an electric discharge device producing radiation and a fluorescent composition or phosphor exposed to its output and excited thereby to radiate in the ultraviolet, and particularly in the erythemal range, which extends from about 2800 A. to about 3200 A. Such an erythemal lamp and phosphor are described in application Serial No. 488,885 of Willard A. Roberts, filed May 28, 1943, and assigned to the assignee of this application, now Patent No. 2,447,210 dated August 17, 1948. The phosphor there described comprises a matrix of alkaline earth metal phosphate (especially calcium orthophosphate) activated with thallium, and the discharge device with which it is associated is of the low pressure, positive column, mercury vapor type employed in ordinary commercial fluorescent lamps, and broadly exemplified in U. S. Patents Nos. 2,182,732 to Meyer, Spanner, and Germer; 2,259,040 to Inman; 2,306,925 to Aicher; and 2,312,245 to Flaws. Such discharge devices are efficient generators of shortwave ultraviolet radiation, and particularly of the 2537 A. resonant radiation of mercury, by which the phosphor in question is excited in a nearly maximum degree. For erythemal purposes, the envelopes of such lamps are made of glass which transmits ultraviolet of more than 2800 A. wave length while absorbing the shorter wave lengths that are harmful to the eyes. The manufacture of the phosphor is also described in the said Roberts application.

I have now discovered a new way of making such phosphor or fluorescent material, whereby its efficiency as a generator of erythemal ultraviolet can be considerably increased. While the radiation of my product covers the same range of ultraviolet as that of the Roberts product, its emission in the narrower erythemal portion of this range can be made much stronger or brighter in the best-prepared specimens, partly by enhancement of radiant intensity over the whole ultraviolet range of the phosphor, and partly because the peak intensity of the emission falls closer to the erythemal range. In comparison with a quantum efficiency of some 55 per cent for the total radiation from favorable specimens of the Roberts product, and of some 15 to 20 per cent for the radiation in the erythemal range of 2800 to 3200 A., favorable specimens of my product show a total quantum efficiency of no less than 90%, higher than for any phosphor now used in fluorescent lamps, and an efficiency for the erythemal range that is of the order of 30 to 40 per cent. These figures are for the radiation of the phosphor alone, and not for that from a mercury vapor lamp containing the phosphor. As a means of converting electrical energy into erythemal radiation, a fluorescent lamp such as above mentioned containing my phosphor gives between five and six times the efficiency of the sun lamp known commercially as the "S4." My product also shows the same essential freedom from visible light emission that characterizes the Roberts phosphor. By this I mean that there is no light from the phosphor itself (apart from the exciting shortwave source) that is perceptible to the eye, and that at most the luminous output is of the order of only about one per cent of the total radiant output.

To secure the high efficiency above referred to as characteristic of my product in favorable specimens, it is not enough merely to introduce or mix a thallium ingredient (whether metal or compound) into a batch of previously prepared alkaline earth metal phosphate of suitable purity, and to heat to a temperature such as hereinafter indicated. In my process, the phosphor is indeed prepared by a method which involves heating and calcining phosphate of alkaline earth metal as the matrix material in the effective presence of thallium as the activator; but preferably (as also in Roberts' process), this alkaline earth metal phosphate is synthesized in the effective presence of the thallium, by reaction between suitable ingredients comprising alkaline earth metal and the phosphoric radical $-PO_4$, before applying the degree of heat necessary to bring the thallium into activating relation to the phosphate. Amongst phosphates of the alkaline earth metals, my invention is especially concerned with the normal orthophosphate of calcium, $Ca_3(PO_4)_2$, as the matrix material.

Reaction of calcium and phosphoric components to yield only calcium orthophosphate and volatiles is in itself well known in chemistry, as well as the reagents that react in this way. What has not been thus known is that the destiny of the product as a thallium-activated phosphor calls for special conditions in the synthesis: that it should take place in the very presence of the activating thallium; and that the calcium and phosphoric components should yield up their volatiles and interact at relatively low temperatures. Here, again, the break-down temperatures of various calcium and phosphoric compounds are well known; but it has not been known that low temperatures of break-down and interaction are essential to give the more efficient thallium activated calcium orthophosphate. The interaction of the calcium and phosphoric components takes place at higher or lower temperatures according as their individual breakdown temperatures or resistance to heat are higher or lower. Any calcium and phosphoric compounds that break down and interact at temperatures of the order of 200° C. or lower are suitable, according to my experience, when they yield only volatiles in addition to the calcium phosphate.

As described in the Roberts application, the matrix-forming components are calcium nitrate and diammonium phosphate, $Ca(NO_3)_2 \cdot 4H_2O$ and $(NH_4)_2HPO_4$, whose reaction to produce the calcium phosphate $Ca_3(PO_4)_2$ liberates $NO_2$, $H_2O$, and $NH_3$ to escape as gas or vapor. Besides using an excess of calcium nitrate which yields excess CaO in the product, Roberts also uses sulphuric acid ($H_2SO_4$) in excess of that which reacts with the excess CaO, this excess of acid also passing off as gas or vapor. And he points out that without the use of sulphuric acid the phosphor ultimately produced shows only about $\frac{1}{10}$ the brightness of his product.

I have found that this necessity of using sulphuric acid in the Roberts process arises from the character of the reactants, and especially from the use of such a substance as calcium nitrate. In the earlier stages of heating, at any rate, $Ca(NO_3)_2$ exerts a deleterious influence, partly by acting as a flux or agglomerating agent during a period when the heated mixture melts by deliquescence of the nitrate and dries out, with the result that the phosphor ultimately produced is coarse-grained and of inferior brightness as compared with products obtainable according to my invention. This is because the calcium nitrate does not break down or react with the phosphoric component at ordinary "room" temperatures of some 20° C., or even in the earlier stages of heating, but only at a much higher temperature. The correspondingly high intrinsic resistance of calcium nitrate to thermal decomposition is shown by the relatively high melting point of 561° C. for the anhydrous substance.

As already intimated, I have found that a phosphor product showing the marked superiority above indicated can be obtained by employing calcium and phosphoric components which decompose and interact at relatively low temperatures, much lower than calcium nitrate. At the same time, the need for an excess of CaO or of any matrix-forming reactant is obviated, as well as that of using sulphuric acid or the like, and a phosphor of much finer grain size is obtained, as fine as a 2 to 4 micron particle size or diameter, which requires no reductive grinding to prepare it for use. A further advantage is greater uniformity or reproducibility of desired qualities in different batches of the product. The employment of a more readily decomposable and reactant phosphoric component than diammonium phosphate also contributes to all this, as well as the avoidance of heat-resistant calcium components, and the stoichiometric character of the matrix.

Thallium and its compounds are rather volatile, so that much of the thallium component used with the calcium and phosphoric components is lost in the heating to synthesize and activate the matrix. I have found, however, that by producing a matrix of stoichiometric normal calcium orthophosphate without an excess of either the phosphoric or the calcium component, as becomes practicable with reactants such as I have indicated, more thallium can be retained in the phosphor; or, if desired, a higher degree of heat can be used in activating or "forming" the phosphor without incurring excessive loss of thallium. Indeed, I have found that the absence of any excess of the calcium component allows of having in the phosphor a greater proportion of retained thallium than is necessary to give maximum initial brightness; and I have found that this excess of retained thallium reduces the loss of brightness which the phosphor sustains in fluorescent lamp manufacture, and especially in the usual grinding of the phosphor with the organic binder used in applying it to lamp envelopes. On the other hand, an excess of the phosphoric component acts as a flux and tends to agglomeration and sintering, and also tends to the formation of pyrophosphate instead of orthophosphate, with a product of inferior brightness.

The essential identity and emission of the phosphor depend on its being the orthophosphate rather than any other phosphate, whether more acid than ortho, like pyrophosphate or metaphosphate, or more basic, like apatite or tetraphosphate. Its efficiency depends on its not being overheated in forming it. A metaphosphate or a pyrophosphate phosphor activated with thallium not only gives little or no ultraviolet, but is characterized by the visible light output of violet blue color described in U. S. Patent No. 2,270,124 to Huniger & Panke, which is so bright as to be termed "medium" in comparison with other blues that are termed "very good" or "good." On the other hand, a "thallium-activated" orthophosphate that is heated high enough to fuse or sinter it has virtually no emission of any kind, ultraviolet or visible. For optimum brightness of my product over its characteristic range of ultraviolet emission, which includes the erythemal range above mentioned, the temperature of firing should be of the order of 1000° C., or about 950 to 1100° C., with a preference for approximately or substantially 1000 to 1030° C. This is high enough to sinter or even fuse a metaphosphate or pyrophosphate phosphor as described in the Huniger and Panke patent, but is by no means sufficient to even sinter my orthophosphate product, much less to fuse it.

The ingredients used in compounding the phosphor should preferably be free of any undesired components that will not be expelled by volatilization when they are mixed together, or in the early stages of heating, in order to avoid any need for special purification during or after heating. Any substance which (like calcium nitrate) tends toward an agglomerated product is undesirable, and of course special fluxing additions are to be avoided. In general, the ingredients should be of the high purity that is customary in the preparation of phosphors, preferably reagent grade or better. Freedom from unwanted metals that tend to poison the phosphor and prevent fluorescence is very important. This is especially so in the case of the thallium component, because the generally unavoidable loss of thallium or its compounds by volatilization during heating greatly increases the proportion and effect of small amounts or traces of deleterious metals on the retained thallium; a 50 per cent improvement in total quantum efficiency has been obtained by purifying the thallium component of lead, silver, copper, or other metals that are "poisons" against ultraviolet fluorescence. To obtain high brightness, the ingredients should be brought together in the wet way, partly at least in solution or dispersion, while the particles of the solid ingredient(s) should be as fine as possible.

As regards the calcium component, calcium oxide itself is unsuitable for mixing with a phosphoric component in the wet way, because of the uncontrollable violence of the resulting reaction; but I have found that the reaction is much gentler with calcium compounds wherein the oxide CaO is bound up with components that readily volatilize out of the mixture at room temperature, or in the early stages of heating, these compounds being such as react with the phosphoric component at correspondingly low temperatures, such as some 200° C., or thereabout, as compared with more than 561° C. for calcium nitrate. Especially suitable are calcium hydroxide, $Ca(OH)_2$, and calcium carbonate, $CaCO_3$, which give the brightest phosphors. As contrasted with the stability of calcium nitrate in the mixture, as above mentioned, calcium hydroxide, carbonate, and formate all with the phosphoric component react below 200° C. or even about 150° C., at room temperature or in the early stages of heating. However, phosphors made with calcium formate are not so bright, and those made with calcium acetate and oxalate are still poorer, as are many or all other compounds of this nature, which break down at temperatures well above 200° C.

For the phosphoric component, likewise, those compounds are to be preferred wherein the phosphate radical —$PO_4$ is bound up only with components that readily volatilize out of the mixture at room temperatures, or in the early stages of heating, below about 200° C. or even 150° C., these compounds being themselves decomposable at correspondingly low temperatures such as some 200° C., or thereabout, as compared with more than 561° C. for calcium nitrate. Amongst such compounds, orthophosphoric acid or hydrogen phosphate, $H_3PO_4$, has given the brightest phosphors; but products nearly if not quite as good can be prepared with mono or diethyl phosphate, $(C_2H_5)H_2PO_4$ or $(C_2H_5)_2HPO_4$, or with the commercial mixture of them that is known in the trade as "ethyl phosphoric acid"; or with mono-ammonium phosphate, $(NH_4)H_2PO_4$. Diammonium phosphate $(NH_4)_2HPO_4$ gives a coarser product of inferior brightness. In general, any orthophosphoric esters give good phosphors provided they are water-miscible or soluble and yield by hydrolysis, when the ingredients are brought together in the wet way, phosphoric acid and an alcohol that is sufficiently low-boiling and volatile to go off without charring when the mixture of calcium and phosphoric components is heated to a temperature not exceeding substantially 200° C., such phosphoric esters being in themselves well known to chemists. On the other hand, substances like sodium phosphate would yield an unwanted non-volatile reaction product difficult to wash out completely.

The selection of a thallium component or ingredient offers no problems, since it is the intimate combination of thallium atoms as such with the phosphate structure, by heating, that confers fluorescence, and not any chemical combination in which the thallium is employed. In general, any thallium compound may be used, though of course such as would introduce unwanted separate substances into the product will be avoided in practice, if only to prevent dilution of the phosphor. Accordingly, the bases of preference or choice are merely such as are naturally obvious to skilled chemists. Water-soluble compounds are preferable to free metal or other insoluble forms of thallium, because it is easier to incorporate substances in liquid dispersion (i. e., in solution or in suspension) intimately and uniformly throughout the matrix-forming material. However, this drawback of insolubles is somewhat mitigated by the volatilization of the thallium component during the heating. If it should be desired to use thallium metal as an ingredient and to avoid having it as oxide in the product, the heating of the mixture might be done in an inert environment, such as afforded by an evacuated and hermetically sealed quartz container, although such complications are not generally to be preferred.

The proportions of calcium and phosphoric components used should correspond stoichiometrically to the desired orthophosphate, without excess of either CaO or $P_2O_5$ in the mixture.

Provided the proportion of thallium in the final product is sufficient, the proportion in the original mixture is not critical. A minor percentage is generally enough to assure an adequate amount in the product. The minimum percentage of retained thallium for maximum brightness of the phosphor itself is substantially 0.6 per cent by weight; but to assure the best practicable brightness in a fluorescent lamp, a greater proportion is desirable: for example, a phosphor with 2 to 4 per cent of retained thallium suffers only about one tenth the loss of brightness in grinding with binder that a phosphor having but 0.6% of thallium undergoes.

As a concrete illustration of the process, for the convenience of those desiring to use my invention, I will now give a specific example in detail; but this is not to be understood as defining or limiting the invention in its broader aspects.

As a preliminary step, 3 mols of calcium oxide (CaO), amounting to 168 grams, may be quenched or slaked with enough distilled water to give a stiff paste. The calcium oxide should be of the finest possible grain size, since the grain size of the ultimate phosphor and its flourescent brightness partly depend on this. I have found that the slaking reaction can be controlled and made more gentle by moistening and even saturating the calcium oxide with acetone before adding the water, and that this tends to prevent coarsening of the grain size in the slaking. The acetone is largely volatilized and driven off by the heat of the reaction, or is at any rate expelled in the heating which the product afterward undergoes. After the reaction is complete, the viscous paste is thinned to a homogeneous thin paste by mixing in more water. It is undesirable to add all the water to the calcium oxide initially, because this tends to coarsen the slaked product and to impair the brightness of the finished phorphor.

An aqueous solution of a soluble thallium compound such as thallous hydroxide, TlOH, or thallium phosphate, preferably $TlH_2PO_4$, is added to the calcium hydroxide paste and thoroughly and homogeneously mixed in. The amount of thallium thus added may be 10 to 30 grams or more, and a strength of the solution corresponding to a volume of 70 to 200 cc. (more or less) is suitable. Then a 30 to 50 percent aqueous solution of orthophosphoric acid $H_3PO_4$ is gradually added under constant stirring, the amount of phosphoric acid being just sufficient to assure that all metal is brought into the form of orthophosphate. When thallium phosphate is used in the batch, the added phosphoric acid solution may consist of 231 grams of 85 per cent commercial reagent grade phosphoric acid further diluted with water to 400 to 600 cc.; while when thallium hydroxide is employed, the amount of phosphoric acid may be correspondingly more than 231 grams. Mon-ammonium phosphate, $NH_4H_2PO_4$, may be substituted for $H_3PO_4$ with some sacrifice of brightness in the resulting phosphor; diammonium phosphate, $(NH_4)_2HPO_4$, gives a product of considerably lower brightness and coarser grain size.

The neutralizing reaction between the lime paste and the phorphoric acid develops considerable heat; but as this is not enough to dry the product, external heat is applied to dry it out till it can be crushed and sieved or ball-milled for a short time, so as to break up any agglomerations. It is not preferred to filter off any of the superfluous water, because this would remove any substances in solution, and might destroy the stoichiometric relation between calcium and phosphoric components besides wasting thallium. The dry powder is charged and packed into a covered crucible (as of porcelain or alundum) and "fired," as in an electric muffle furnace, at about 1000° to 1100° C., preferably 1000° to 1030° C. The time of firing depends on the temperature and the amount of the charge: for 1000 to 1030° C. and 25 grams, a period of 40 min. is about right, while a larger charge or a lower temperature requires longer, and vice-versa. As a considerable amount of thallium component volatilizes and is lost during the firing, a few trials may be necessary to determine the very best proportions of this component and the optimum conditions and duration in each particular case.

After cooling, the phosphor is ready for use. It can be coated on the inside of a lamp envelope with the aid of a carbonaceous binder in the usual way, though the grinding to incorporate the powder with the binder should be brief. To give the highest erythemal output, the phosphor coating on the lamp tube should be thinner than is usual for ordinary flourescent tubes.

In the drawings, Fig 1 is a diagram of curves representing the special distribution of the radiation from 15-watt flourescent lamps having their envelopes internally coated with thallium activated calcium phosphate phosphors, the solid curve being for phosphor prepared as herein described, and the dotted or dash curve for phosphor prepared as described in the aforementioned Roberts application.

Fig. 2 shows curves of erythemal effect, obtained by multiplying the values of radiant energy for various wave-lengths in Fig. 1 by the known sensitiveness of the skin to energy of these wavelengths, and plotting the products as ordinates.

Fig. 3 shows a curve of excitability of the phosphor prepared as herein described by ultraviolet radiation of various wavelengths.

As shown in Fig. 1, the radiation from both the old and the new phosphors starts from substantially zero at a wavelength somewhat below 2800 Å., the lower limit of the erythemal range, peaks around 3260 Å. for the new phosphor as against about 3300 Å. for the old, and falls to a relatively low value at 3800 Å., and practically to zero at 4000 Å., which is generally considered the lower limit of the visible. 3200 Å. being the upper limit of the erythemal, the seemingly small shift of the peak of radiant energy toward this value for the new phosphor results in an increase in its real erythemal effect considerably more than proportionate to the greater height of the peak, and seemingly very disproportionate to the magnitude of the shift. This is strikingly shown by the greater ratio of peak values of the solid and dash curves in Fig. 2 than in Fig. 1, and still more by a comparison of the areas under the solid and dash curves in Figs. 2 and 1.

Fig. 3 illustrates another important property of this phosphor, which is largely responsible for its very high efficiency in low pressure mercury vapor discharge devices: viz., the fact that the peak of its excitability at about 2475 Å. falls so close to the resonance radiation of mercury at 2537 Å., to which the phosphor is thus particularly responsive.

What I claim as new and desire to secure by Letters Patent of the United States is:

1. The method of preparing fluorescent thallium-activated calcium orthophosphate which consists of preliminarily reacting at a temperature not exceeding approximately 200° C. a mixture of calcium compound and phosphoric component in stoichiometric proportions of calcium orthophosphate together with sufficient activating thallium compound to give between about 0.6% and 4% thallium in the final product, the calcium compound being of the group consisting of the hydroxide and carbonate and the phosphoric component being of the group consisting of phosphoric acid, ethyl phosphate and ammonium phosphate, drying and comminuting the resultant product and then firing it at a temperature of approximately 950–1100° C. to complete the reaction and activatingly combine the thallium with the orthophosphate structure.

2. The method of preparing fluorescent thallium-activated calcium orthophosphate which consists of preliminarily reacting at a temperature not exceeding approximately 200° C. a mixture of calcium hydroxide and orthophosphoric acid in stoichiometric proportions of calcium orthophosphate together with sufficient activating thallium compound to give between about 0.6% and 4% thallium in the final product, drying and comminuting the resultant product and then firing it at a temperature of approximately 950–1100° C. to complete the reaction and activatingly combine the thallium with the orthophosphate structure.

3. The method of preparing fluorescent thallium-activated calcium orthophosphate which consists of preliminarily reacting at a temperature not exceeding approximately 200° C. a mixture of calcium hydroxide and ethyl phosphate in stoichiometric proportions of calcium orthophosphate together with sufficient activating thallium compound to give between about 0.6% and 4% thallium in the final product, drying and comminuting the resultant product and then firing it at a temperature of approximately 950–1100° C. to complete the reaction and activatingly combine the thallium with the orthophosphate structure.

4. The method of preparing fluorescent thallium-activated calcium orthophosphate which consists of preliminarily reacting at a temperature not exceeding approximately 200° C. a mixture of calcium hydroxide and ammonium phosphate in stoichiometric proportions of calcium orthophosphate together with sufficient activating thallium compound to give between about 0.6% and 4% thallium in the final product, drying and comminuting the resultant product and then firing it at a temperature of approximately 950–1100° C. to complete the reaction and activatingly combine the thallium with the orthophosphate structure.

5. The method of preparing fluorescent thallium-activated calcium orthophosphate which consists of preliminarily reacting at a temperature not exceeding approximately 200° C. a mixture of calcium carbonate and orthophosphoric acid in stoichiometric proportions of calcium orthophosphate together with sufficient activating thallium compound to give between about 0.6% and 4% thallium in the final product, drying and comminuting the resultant product and then firing it at a temperature of approximately 950–1100° C. to complete the reaction and activatingly combine the thallium with the orthophosphate structure.

6. The method of preparing fluorescent thallium-activated calcium orthophosphate which consists of preliminarily reacting at a temperature not exceeding approximately 200° C. a mixture of calcium carbonate and ethyl phosphate in stoichiometric proportions of calcium orthophosphate together with sufficient activating thallium compound to give between about 0.6% and 4% thallium in the final product, drying and comminuting the resultant product and then firing it at a temperature of approximately 950–1100° C. to complete the reaction and activatingly combine the thallium with the orthophosphate structure.

7. The method of preparing fluorescent thallium-activated calcium orthophosphate which consists of preliminarily reacting at a temperature not exceeding approximately 200° C. a mixture of calcium carbonate and ammonium phosphate in stoichiometric proportions of calcium orthophosphate together with sufficient activating thallium compound to give between about 0.6% and 4% thallium in the final product, drying and comminuting the resultant product and then firing it at a temperature of approximately 950–1100° C. to complete the reaction and activatingly combine the thallium with the orthophosphate structure.

8. The method of preparing fluorescent thallium-activated calcium orthophosphate which consists of quenching calcium oxide with sufficient water to give a stiff paste and, after the reaction is complete, adding more water to give a thin paste, adding sufficient thallium compound to give between about 0.6% and 4% thallium in the final product, adding an aqueous solution of orthophosphoric acid in an amount sufficient to give calcium orthophosphate, drying and comminuting the resultant product and then firing it at a temperature of approximately 950–1100° C. to complete the reaction and activatingly combine the thallium with the orthophosphate structure.

HERMAN C. FROELICH.

REFERENCES CITED

The following references are of record in the file of this patent:

UNITED STATES PATENTS

| Number | Name | Date |
| --- | --- | --- |
| 2,257,667 | Aschermann | Sept. 30, 1941 |
| 2,270,124 | Huniger | Jan. 13, 1942 |
| 2,306,567 | Roberts | Dec. 29, 1942 |
| 2,306,626 | Huniger | Dec. 29, 1942 |
| 2,447,210 | Roberts | Aug. 17, 1948 |

OTHER REFERENCES

Lange's Handbook of Chemistry, fourth edition, 1941.

Certificate of Correction

Patent No. 2,512,270　　　　　　　　　　　　　　　　　　　June 20, 1950

HERMAN C. FROELICH

It is hereby certified that error appears in the printed specification of the above numbered patent requiring correction as follows:

Column 5, line 24, strike out the words "with the phosphoric component" and insert the same after "react" same line; column 7, line 49, for "special" read *spectral*;

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*